(12) United States Patent
Paryani et al.

(10) Patent No.: US 11,378,954 B2
(45) Date of Patent: Jul. 5, 2022

(54) MULTI-PROCESSOR SOC SYSTEM

(71) Applicant: Faraday & Future Inc., Gardena, CA (US)

(72) Inventors: Anil Paryani, Cerritos, CA (US); Michael Hong, Irvine, CA (US); Aziz Umit Batur, Torrance, CA (US); Bibhrajit Halder, Sunnyvale, CA (US); Hong S. Bae, Torrance, CA (US)

(73) Assignee: Faraday&Future Inc., Gardena, CA (US)

( * ) Notice: Subject to any disclaimer, the term of this patent is extended or adjusted under 35 U.S.C. 154(b) by 366 days.

(21) Appl. No.: 15/636,081

(22) Filed: Jun. 28, 2017

(65) Prior Publication Data

US 2018/0143633 A1 May 24, 2018

Related U.S. Application Data

(60) Provisional application No. 62/355,841, filed on Jun. 28, 2016.

(51) Int. Cl.
*B60W 10/22* (2006.01)
*G05D 1/00* (2006.01)
(Continued)

(52) U.S. Cl.
CPC ........... *G05D 1/0088* (2013.01); *B60W 10/12* (2013.01); *B60W 10/18* (2013.01); *B60W 10/20* (2013.01); *B60W 10/22* (2013.01); *B60W 30/08* (2013.01); *G05D 1/0077* (2013.01); *G05D 1/0246* (2013.01); *G05D 1/0259* (2013.01); *G06F 11/1629* (2013.01); *H04L 12/40013* (2013.01); *B60W 2050/0292* (2013.01);
(Continued)

(58) Field of Classification Search
CPC .. G05D 1/0088; G05D 1/0259; G05D 1/0246; H04L 2012/40273; H04L 2012/40215; H04L 12/40013; B60W 30/08; B60W 10/22; B60W 10/20; B60W 10/18; B60W 10/12
See application file for complete search history.

(56) References Cited

U.S. PATENT DOCUMENTS

2007/0219666 A1 * 9/2007 Filippov .................. B60T 7/22
   700/245
2013/0253767 A1 * 9/2013 Lee ....................... B60W 50/04
   701/42

(Continued)

*Primary Examiner* — Mathew Franklin Gordon
(74) *Attorney, Agent, or Firm* — Veros Legal Solutions, LLP

(57) ABSTRACT

A multi-processor architecture for automated driving systems can be used to improve performance and provide design flexibility. For example, a multi-processor architecture can be used to implement command generation and safety functionality in different processors. The command generation processor can be a high performing processor compared with the safety processor. The safety processor can verify the safety of commands output from the command generation processor and provide additional I/O channels that are typically absent on high performing processors. Additionally, processing of some sensor data can be moved to expansion modules with additional processors to reduce bottlenecks and provide design flexibility for systems with different sensing requirements.

19 Claims, 3 Drawing Sheets

(51) Int. Cl.
*G05D 1/02* (2020.01)
*B60W 10/12* (2012.01)
*B60W 10/20* (2006.01)
*B60W 10/18* (2012.01)
*B60W 30/08* (2012.01)
*H04L 12/40* (2006.01)
*G06F 11/16* (2006.01)
*B60W 50/029* (2012.01)
*G06F 11/07* (2006.01)

(52) U.S. Cl.
CPC .. *G05D 2201/0213* (2013.01); *G06F 11/0757* (2013.01); *H04L 2012/40215* (2013.01); *H04L 2012/40273* (2013.01)

(56) References Cited

U.S. PATENT DOCUMENTS

| | | | | |
|---|---|---|---|---|
| 2014/0379150 | A1* | 12/2014 | Guo | G06F 1/26 700/286 |
| 2016/0297430 | A1* | 10/2016 | Jones | B60W 50/0097 |
| 2019/0227553 | A1* | 7/2019 | Kentley-Klay | B60H 1/00735 |

\* cited by examiner

MULTI-PROCESSOR SOC SYSTEM

CROSS-REFERENCE TO RELATED APPLICATIONS

This application claims the benefit of U.S. Provisional Application No. 62/355,841, filed Jun. 28, 2016, the entirety of which is hereby incorporated by reference.

FIELD OF THE DISCLOSURE

This relates generally to vehicles with automated driving systems, and more particularly, to a multi-processor architecture for automated driving systems.

BACKGROUND OF THE DISCLOSURE

Modern vehicles, especially automobiles, increasingly provide automated driving and driving assistance systems such as blind spot monitors, automatic parking, and automatic navigation. Automated driving systems including self-driving capabilities can require reliable and fast processing of large amounts of data from a number of sensors.

SUMMARY OF THE DISCLOSURE

This relates to a multi-processor architecture for automated driving systems. Conventional automated driving systems use a single, safety-rated system-on-chip (SoC) processor to process data from sensors (e.g., cameras, radar, etc.) and generate driving commands based thereon. However, such a conventional architecture can be limiting in a number of ways. For example, some safety-rated automotive SoC processors can be lower performing when compared with higher performing processors on the market and can experience processing bottlenecks when processing large amounts of data from a variety of sensors. A multi-processor architecture can be used to implement command generation functionality and safety functionality in different processors. The command generation processor can be a high performing processor as compared with the safety processor. The command generation processor can process the data and generate automated driving commands. The safety processor can verify the safety of the automated driving commands. Additionally, the safety processor can gateway additional I/O channels that may be absent or present in insufficient quantity on some high performing processors. In some examples, processing of some sensor data can be moved to one or more expansion modules with additional processors to reduce processing bottlenecks. Additionally, expansion module can provide design flexibility for systems with different sensing requirements such that expansion modules can be added or removed from the system as needed without requiring a redesign.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to a multi-processor architecture for automated driving systems. Conventional automated driving systems use a single, safety-rated system-on-chip (SoC) processor to process data from sensors (e.g., cameras, radar, etc.) and generate driving commands based thereon. However, such a conventional architecture can be limiting in a number of ways. For example, some safety-rated automotive SoC processors can be lower performing when compared with higher performing processors on the market and can experience processing bottlenecks when processing large amounts of data from a variety of sensors. A multi-processor architecture can be used to implement command generation functionality and safety functionality in different processors. The command generation processor can be a high performing processor as compared with the safety processor. The command generation processor can process the data and generate automated driving commands. The safety processor can verify the safety of the automated driving commands. Additionally, the safety processor can gateway additional I/O channels that may be absent or present in insufficient quantity on some high performing processors. In some examples, processing of some sensor data can be moved to one or more expansion modules with additional processors to reduce processing bottlenecks. Additionally, expansion module can provide design flexibility for systems with different sensing requirements such that expansion modules can be added or removed from the system as needed without requiring a redesign.

Figure 1:
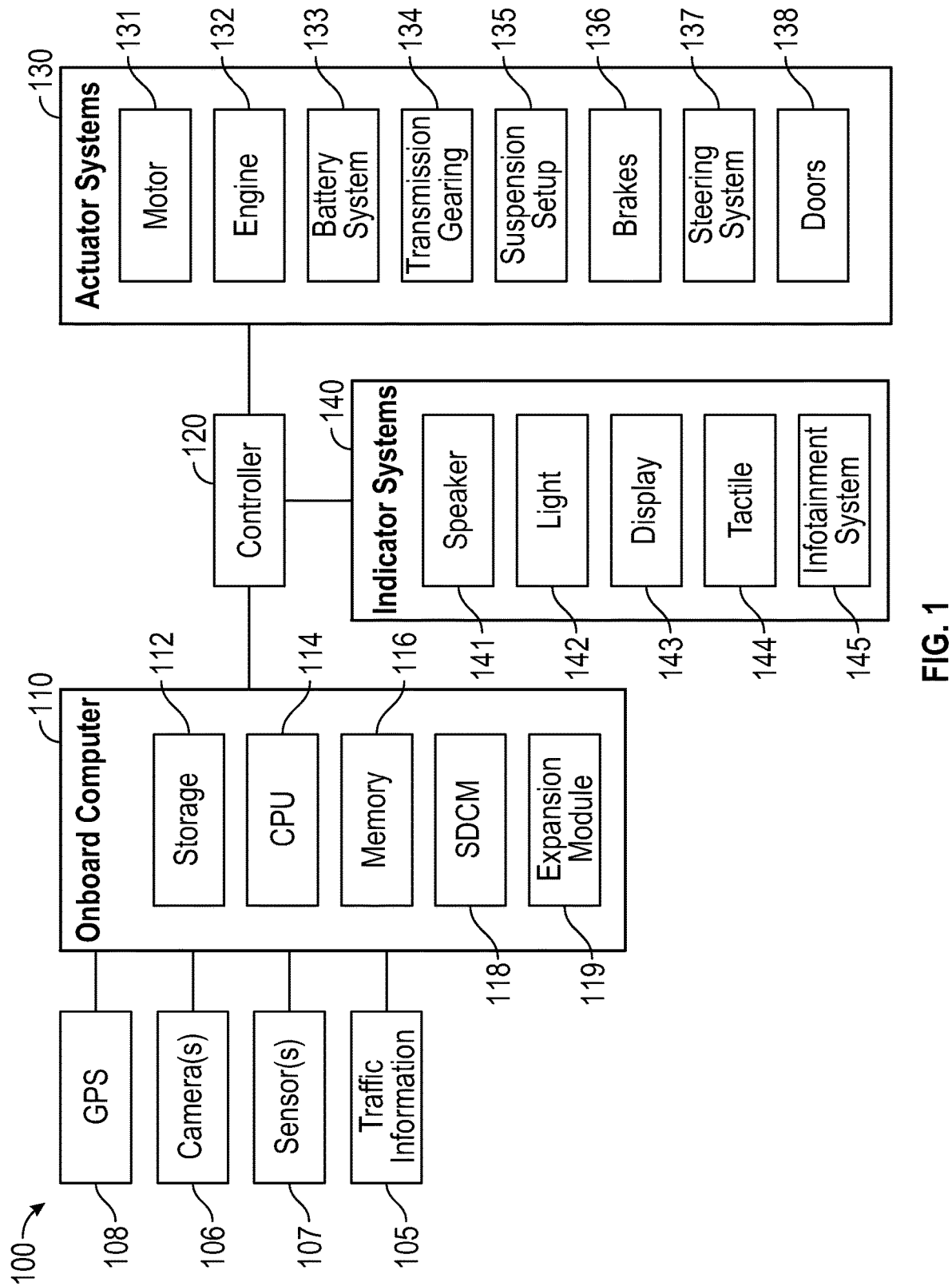
FIG. 1 illustrates an exemplary system block diagram of a vehicle control system according to examples of the disclosure.

FIG. 1 illustrates an exemplary system block diagram of a vehicle control system according to examples of the disclosure. Vehicle control system 100 can perform automated driving and driving assistance. System 100 can be incorporated into a vehicle, such as a consumer automobile. Other example vehicles that may incorporate the system 100 include, without limitation, airplanes, boats, motorcycles or industrial automobiles. Vehicle control system 100 can include one or more cameras 106 capable of capturing image data (e.g., video data) for determining various characteristics of the vehicle's surroundings. Vehicle control system 100 can also include one or more other sensors 107 (e.g., radar, ultrasonic, LIDAR, etc.) capable of detecting various characteristics of the vehicle's surroundings. For example, sensors 107 can be used for detecting the presence of an object. Global Positioning System (GPS) receiver 108 capable of determining the location of the vehicle. In some examples, traffic information 105 can be received (e.g., by an antenna) or accessed (e.g., from storage 112 or memory 116), and can be used for determining automated driving routes.

Vehicle control system 100 can include an on-board computer 110 coupled to the traffic information 105, cameras 106, sensors 107, and GPS receiver 108. On-board computer 110 can be capable of receiving one or more of the traffic information, image data from the cameras, outputs from the sensors 107 and the GPS receiver 108. On-board computer 110 can include storage 112, memory 116, and a processor (central processing unit (CPU)) 114. CPU 114 can, for example, execute automated driving software stored in storage 112 and/or memory 114. For example, CPU 114 can process the traffic information, image data, sensor outputs and GPS outputs and make driving decisions thereon. For example, processing can include detecting and tracking objects in the environment, tracking vehicle parameters (e.g., odometry, location), navigation planning, lane selection/change planning, motion planning, determining automated driving commands, etc. Additionally, storage 112 and/or memory 116 can store data and instructions for performing the above processing. Storage 112 and/or memory 116 can be any non-transitory computer readable storage medium, such as a solid-state drive, a hard disk drive or a random access memory (RAM) among other possibilities. In some examples, on-board computer 110 can include or be implemented with a multi-processor self-driving control module 118 (and/or expansion module 119) as described in more detail below.

The vehicle control system 100 can also include a controller 120 capable of controlling one or more aspects of vehicle operation based on automated driving commands received from the processor. In some examples, the vehicle control system 100 can be connected to (e.g., via controller 120) one or more actuator systems 130 in the vehicle and one or more indicator systems 140 in the vehicle. The one or more actuator systems 130 can include, but are not limited to, a motor 131 or engine 132, battery system 133, transmission gearing 134, suspension setup 135, brakes 136, steering system 137, and door system 138. The vehicle control system 100 can control, via controller 120, one or more of these actuator systems 130 during vehicle operation; for example, to open or close one or more of the doors of the vehicle using the door actuator system 138, to control the vehicle during autonomous driving or parking operations using the motor 131 or engine 132, battery system 133, transmission gearing 134, suspension setup 135, brakes 136 and/or steering system 137, etc. The one or more indicator systems 140 can include, but are not limited to, one or more speakers 141 in the vehicle, one or more lights 142 in the vehicle, one or more tactile actuators 144 in the vehicle (e.g., as part of a steering wheel or seat in the vehicle), and/or one or more infotainment systems 145 (e.g., providing entertainment and/or information to the user). The vehicle control system 100 can control, via controller 120, one or more of these indicator systems 140 to provide indications to a user of the vehicle.

Figure 2:
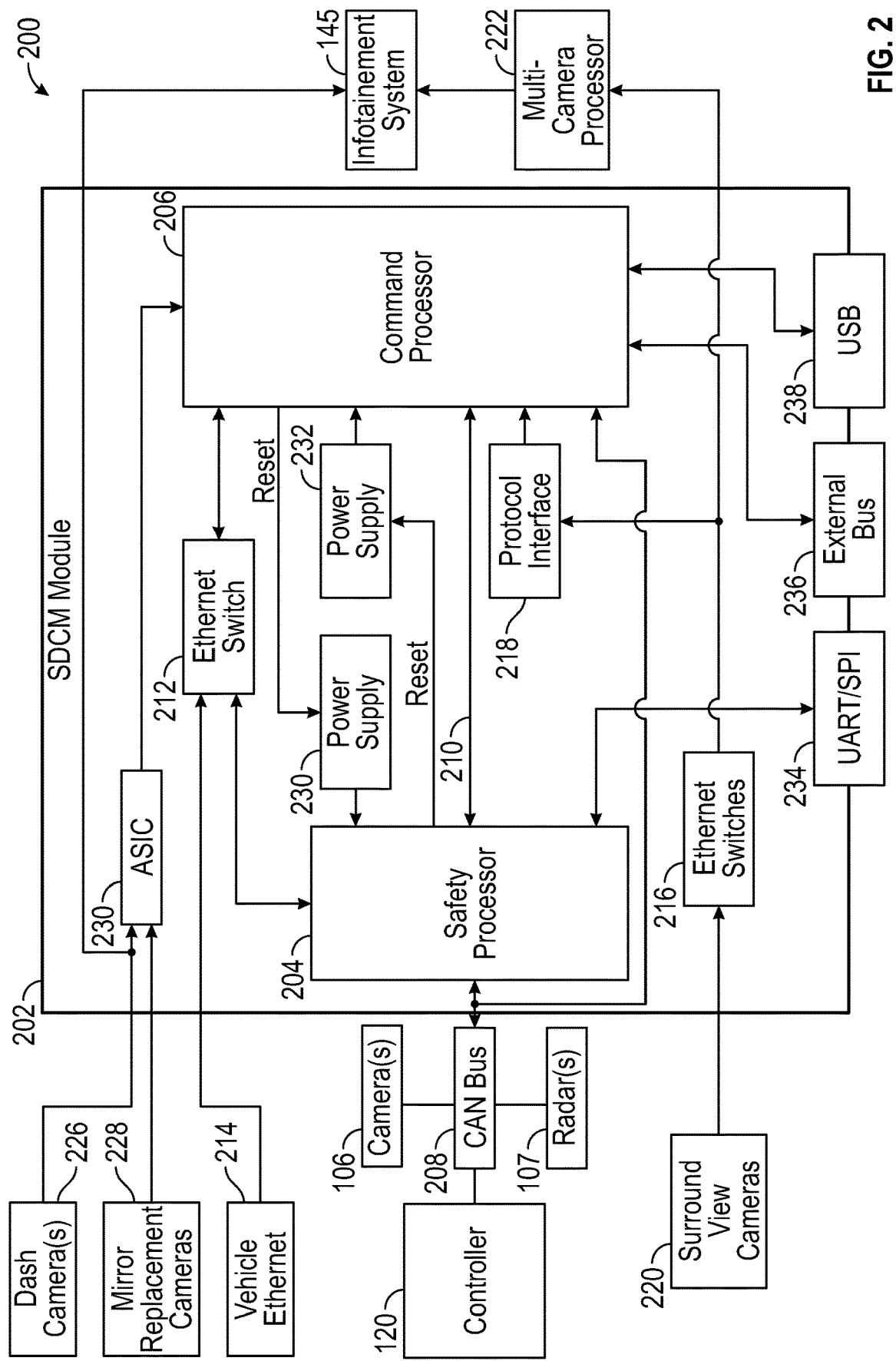
FIG. 2 illustrates an exemplary system block diagram of a self-driving control module according to examples of the disclosure.

As described above, rather than implementing a self-driving control module with a single SoC processor, the self-driving control module can be implemented with multiple SoC processors. FIG. 2 illustrates an exemplary system block diagram of a self-driving control module 200 according to examples of the disclosure. Self-driving control module 200 can include at least two processors—safety processor 204 and command processor 206—that can be mounted on a printed circuit board 202, for example. Command processor 206 can process one or more inputs and generate automated driving commands (self-driving commands) as outputs. The outputs can include, for example, a torque command (e.g., acceleration or deceleration) and a steering command. Safety processor 204 can perform sanity checks of the self-driving commands output by command processor 206. For example, safety processor 204 can redundantly determine whether there is an object in front of the vehicle (e.g., via radar, LIDAR, etc.) and deny a positive torque request output by command processor 206. In some examples, safety processor 204 can generate an output indicative of whether to allow or deny the output commands from processor 206 ("verification command"). The self-driving commands (torque and steering) and the verification command can be transmitted to the controller 120 via a controller area network (CAN) bus 208. Controller 120 can cause actuator systems 130 to perform or not perform the self-driving commands based on the verification command. For example, if the verification command is positive (i.e., the command is verified), controller 120 can perform the self-driving command including, for example, a steering request and a torque request. However, if the verification command is negative (i.e., the command is not verified, e.g., because it is likely to result in a collision with an object), the controller 120 can ignore the command or perform an alternative command (e.g., braking or steering to avoid the collision, notifying the driver, etc.). By separating the safety processing from command generation processing, a higher performing processor can be used for processing the data necessary for generating commands, rather than limiting performance to existing safety-rated (or otherwise slower) processors, which typically have more limited processing capabilities.

As discussed above, command processor 206 can process one or more inputs. The one or more inputs can include inputs from, for example, cameras 106 and/or sensors 107. A vehicle may include various cameras including one or more dash cameras 226, one or more mirror replacement cameras 228, and one or more surround view cameras 220. One or more of the cameras can be stereovision cameras. In some examples, the one or more dash cameras 226 and one or more mirror replacement cameras 228 can be received by application specific integrated circuit (ASIC) 230. ASIC 230 can gateway the camera inputs and transmit the camera inputs to command processor 206. For example, the one or more dash cameras 226 and one or more mirror replacement cameras 228 can use a low-voltage differential signaling (LVDS) bus. ASIC 230 can transmit the LVDS signals unchanged to command processor 206 or can convert one or more of the camera inputs to a different type of signal before transmitting the inputs to command processor 206 (e.g., if command processor 206 does not have enough LVDS ports).

The one or more surround view cameras 220 can be received by Ethernet switches 216. For example, the one or more Ethernet switches can be BroadR-Reach automotive Ethernet switches. Ethernet switches 216 can gateway the camera inputs and transmit the camera inputs to command processor 206 (or another dedicated processor such as a dedicated parking assist process (not shown)). If command processor 206 has sufficient Ethernet ports, the camera inputs can be transmitted directly from Ethernet switches 216 to command processor 206. However, if an insufficient number of Ethernet ports are available to command processor 206, protocol interface 218 can convert the Ethernet camera input to another protocol. For example, protocol interface 218 can convert the camera input from Ethernet protocol to peripheral component interconnect (PCI) protocol. Intercepting the surround view cameras 220 with the Ethernet switches can provide camera data typically used for infotainment purposes for processing when needed for certain modes (e.g., parking assistance mode), that may not be used regularly for self-driving modes.

In addition to transferring camera inputs to command processor 206, camera inputs from the one or more dash cameras 226 and one or more surround view cameras 220, the camera inputs can be transferred to the vehicle infotainment system 145. In some examples, camera data from multiple surround view cameras 220 can be stitched together by multi-camera processor 222. In some examples, the multiple surround view cameras 220 may include built-in processing to stitch the camera views together, in which case multi-camera processor 222 can be omitted. Although illustrated separately from circuit board 202, in some examples, multi-camera processor 222 can be mounted on circuit board 202.

Additionally or alternatively, the vehicle may include various sensors including one or more radar sensors. The one or more radar sensors can be mounted on the front, rear, or sides of the vehicle, for example. In some examples, command processor 206 may not have enough input ports to receive inputs from the all of the cameras and sensors. The addition of a separate safety processor 204 and command processor 206, in addition to separating the command and safety functions for improved processing performance, can provide additional input ports for the self-driving control module 200. For example, CAN bus 208 may include multiple CAN channels (e.g., 4, 6, 8, 10, etc.), but more CAN channels than CAN ports available on command processor 206 (e.g., 2, 4, etc.). Safety processor 204, however, may have additional input ports for CAN channels, which can supplement the number of CAN channels that can be received by the self-driving control module 200. The safety processor 204 can gateway this information through a real time communication channel 210, such as a (Universal Asynchronous Receiver/Transmitter) UART or (Serial Peripheral Interface) SPI bus or channel, to the command processor 206.

Additionally or alternatively, one or more additional cameras 106 (i.e., in additional to the cameras discussed above) can be input via CAN bus 208 and transmitted either directly to command processor 206 or via safety processor 204 as described above with respect to radar inputs discussed above. Safety processor 204 and command processor 206 can also be in communication with other sensors (e.g., GPS, traffic information), controller 120, actuator systems 130 or indicated systems 140 by vehicle Ethernet 214 via Ethernet switch 212.

Self-driving control module 200 can include one or more power supplies. For example, self-driving control module 200 can include power supply 230 and power supply 232. Power supply 230 can provide power to safety processor 204, and power supply 232 can provide power to command processor 206. Self-driving control module 200 can include a watchdog architecture to reset a power supply and processor when incorrect behavior of the processor is detected. For example, safety processor 204 can detect that the behavior of command processor 206 is incorrect and reset power supply 232 (and thereby command processor 206) in response. Likewise, command processor 206 can detect the behavior of safety processor 204 is incorrect and reset power supply 230 (and thereby safety processor 204) in response. Additionally, in some examples, a processor can include more than one core and internally trigger a reset when incorrect behavior is detected by one of the cores.

Self-driving control module 200 can also include additional communications channels/buses for use with an expansion or companion module, as will be discussed in more detail below. For example, self-driving control module 200 can include UART/SPI bus 234, external bus 236 and/or universal serial bus (USB) 238. These buses can be connected to the expansion module via one or more connectors.

It is to be understood that the self-driving control module 200 is not limited to the components and configuration of FIG. 2, but can include other or additional components in multiple configurations according to various examples. Additionally, the components of self-driving control module 200 can be included within a single device, or can be distributed between multiple devices. Additionally, it should be understood that the connections between the components may be unidirectional or bidirectional depending on the implementation irrespective of the arrows shown in the configuration of FIG. 2.

In some examples, the self-driving control module 200 can be used in conjunction with an expansion module. The expansion module can accept and process additional inputs for use in the command generation or command verification, when necessary, and can be omitted when unnecessary. For example, an expansion module can be used to process light detection and ranging (LIDAR) data. LIDAR sensors, however, are relatively expensive and may not be included in all vehicle systems. Thus, the expansion module provides flexibility in the system. It should be understood, however, that the expansion module is not limited to LIDAR processing from LIDAR sensors (e.g., other additional sensors are processing are possible). Additionally, LIDAR processing can also be included in the primary self-driving control module described above instead of being implemented on a separate printed circuit board module.

Figure 3:
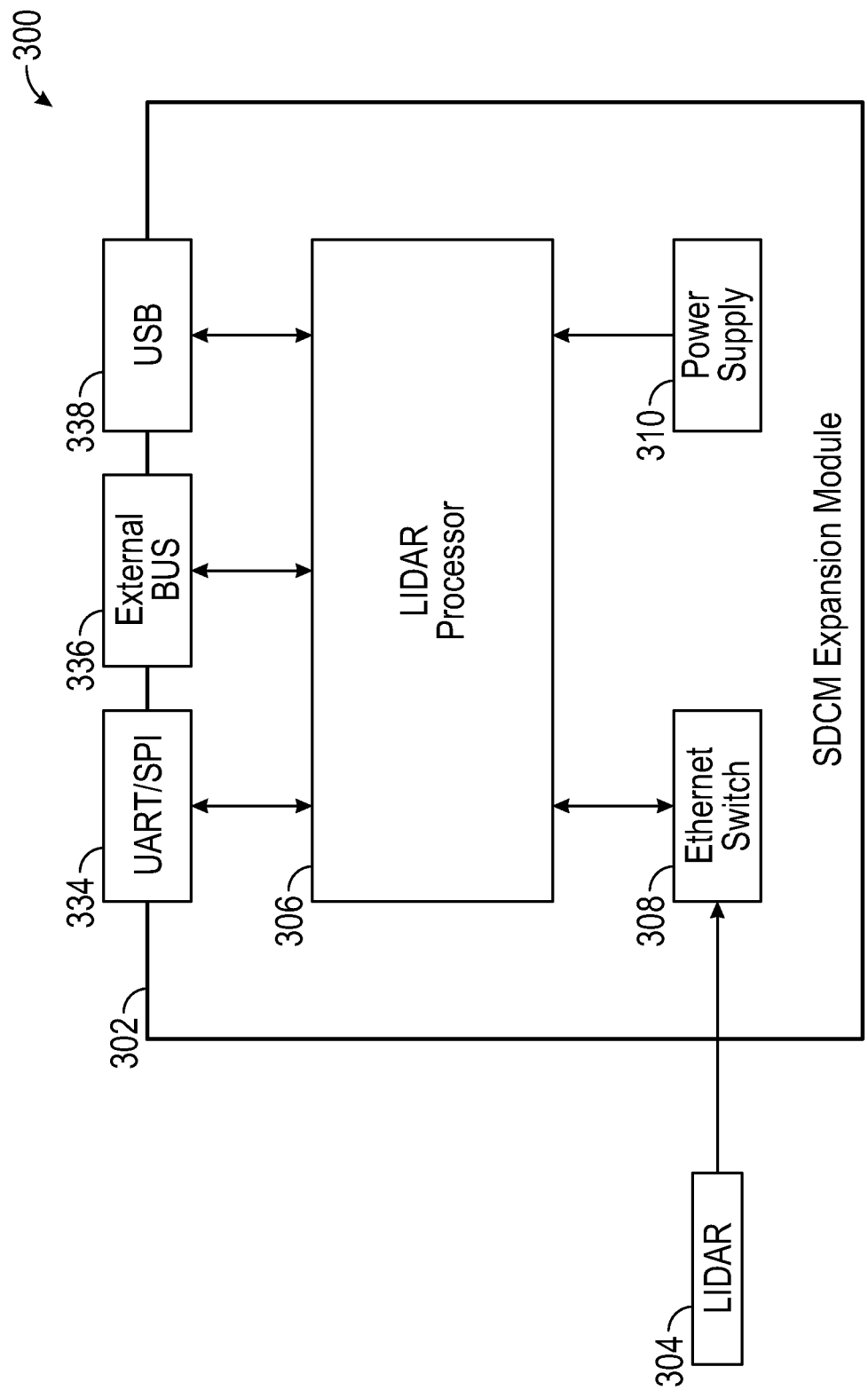
FIG. 3 illustrates an exemplary system block diagram of a self-driving control expansion module according to examples of the disclosure.

FIG. 3 illustrates an exemplary system block diagram of a self-driving control expansion module 300 according to examples of the disclosure. Expansion module 300 can include a LIDAR processor 302 mounted on printed circuit board 302, for example. LIDAR processor 306 can receive and process LIDAR data from LIDAR sensors 304 received via Ethernet switch 308. The processed data and/or raw data can be communicated from the expansion module 300 to the self-driving control module 200 and can be fused with other sensor data (e.g., cameras, radar, etc.) at command processor 206, to generate automated driving commands. The use of a separate LIDAR processor 306 to process LIDAR data can avoid processing bottlenecks of having the LIDAR data processed by either command processor 206 or safety processor 204. Additionally, in some examples, data from sensors on self-driving control module 300 can be transferred to expansion module for processing when LIDAR processor has available processing resources available.

Communications between the self-driving control module 200 and expansion module 300 can be accomplished via one or more communications channels/buses such as UART/SPI bus 334, external bus 336 and/or USB 338. These buses can be connected to the primary self-driving control module 200 via one or more connectors. To enable communication of raw or partially processed (reduced bandwidth) LIDAR data between the self-driving control module 200 and the expansion module 300, a robust and high-speed external bus 336 can be used. For example, a memory bus of the command processor 206 and the LIDAR processor 306 can be used to reliably transfer data therebetween at a high speed. The memory interface, for example, can include error detection mechanisms that could notify the processor(s) of communication errors in data transfers between the processors. Additionally, in some examples, the self-driving control module 200 or the expansion module 300 can include some memory (e.g., RAM) on the same external bus as well. In some examples, the command processor 206 and the LIDAR processor 306 can be of the same SoC processor type to simplify communication therebetween. Additionally, the command processor 206 and the LIDAR processor 306 can communicate via USB 338. Safety processor 204 can communicate with LIDAR processor 306 via a slower UART/SPI bus 334. LIDAR processor 306 can provide the safety processor 204 with higher level LIDAR data (i.e., object data) indicative of objects in the environment that can be used to verify automated driving commands. Additionally, UART/SPI bus 334 can be used to transmit a reset signal to the expansion module 300 (e.g., an extension of the watchdog architecture described above). When errors are detected, power supply 310 can be reset, thereby resetting LIDAR processor 306.

Safety processor 204, command processor 206 and LIDAR processor 306 can each include multiple cores. For example, safety processor 204 can include at least dual cores so as to duplicate the command verification functionality in each core, and report an error internally when an error is detected in one of the cores. Command processor 206 and/or LIDAR processor 306 can include multiple cores to handle the heavy processing load of raw data from cameras, radar, LIDAR and/or other sensors.

Therefore, according to the above, some examples of the disclosure are directed to a system. The system can comprise a first processor and a second processor coupled to the first processor. The first processor can be configured to: receive first data from a first plurality of sensors; and generate one or more automated driving commands. The second processor can be configured to: receive the one or more automated driving commands from the first processor; receive second data from a second plurality of sensors; and verify the one or more automated driving commands received from the first processor based on the second data. Additionally or alternatively to one or more of the examples disclosed above, in some examples, the system can further comprise a controller coupled to the first processor and the second processor. The controller can be configured to in accordance with a determination that the one or more automated driving commands are verified, perform the one or more automated driving commands; and in accordance with a determination that the one or more automated driving commands are not verified, forego performing the one or more automated driving commands. Additionally or alternatively to one or more of the examples disclosed above, in some examples, a portion of the second data received at the second processor from the second plurality of sensors can be received via a first type of communication channel and transferred to the first processor via a second type of communication channel. The first type of communication channel can be different than the second type of communication channel. Additionally or alternatively to one or more of the examples disclosed above, in some examples, verifying the automated driving commands can comprise: determining, from the second data, whether one or more of the automated driving commands conflicts with one or more objects detected based on the second data; in accordance with the determination that the one or more of the automated driving commands conflicts with the one or more objects in the second data, generating a negative verification command; and in accordance with the determination that the one or more of the automated driving commands does not conflict with the one or more objects in the second data, generating a positive verification command. Additionally or alternatively to one or more of the examples disclosed above, in some examples, the second data can include at least one of radar data from one or more radar sensors or LIDAR data from one or more LIDAR sensors, and the one or more objects can be detected from at least one of the radar data or the LIDAR data. Additionally or alternatively to one or more of the examples disclosed above, in some examples, the system can further comprise: a first power supply coupled to the first processor; and a second power supply coupled to the second processor. The first processor can be configured to generate a first reset signal to reset the second power supply when a first reset condition is detected at the first processor, and the second processor can be configured to generate a second reset signal to reset the first power supply when a second reset condition is detected at the second processor. Additionally or alternatively to one or more of the examples disclosed above, in some examples, the system can further comprise: a third processor coupled to the second processor. The third processor can be configured to: receive third data from a third plurality of sensors; processes the third data from the third plurality of sensors; and transmit the processed third data to at least the second processor. Additionally or alternatively to one or more of the examples disclosed above, in some examples, the second processor and the third processor can be in communication via a high-speed memory bus. Additionally or alternatively to one or more of the examples disclosed above, in some examples, the first processor and second processor can be mounted on a first printed circuit board and the third processor can be mounted on a second printed circuit board. Additionally or alternatively to one or more of the examples disclosed above, in some examples, processing the third data can include generating object data from the third plurality of sensors. The third processor can be further configured to transmit the object data generated from the third plurality of sensors to the first processor. Additionally or alternatively to one or more of the examples disclosed above, in some examples, the automated driving commands can include at least one of a torque request and a steering request. Additionally or alternatively to one or more of the examples disclosed above, in some examples, the system can further comprise: a plurality of switches coupled to receive camera data from a plurality of cameras. The plurality of switches can be configured to: transmit the camera data to the first processor; and transmit the camera data to an infotainment system. Additionally or alternatively to one or more of the examples disclosed above, in some examples, the system can further comprise: an application specific integrated circuit coupled to receive camera data from a plurality of cameras. The application specific integrated circuit can be configured to transmit the camera data to the first processor; and transmit the camera data to an infotainment system.

Other examples of the disclosure are directed to a vehicle. The vehicle can comprise: one or more sensors; and a plurality of processors coupled to the one or more sensors. The plurality of processors can include at least a first processor and a second processor. The first processor can be configured to generate one or more automated driving commands based on first data received from a first plurality of the sensors. The second processor can be coupled to the first processor and configured to verify the one or more automated driving commands received from the first processor based on second data received from a second plurality of the sensors. Additionally or alternatively to one or more of the examples disclosed above, in some examples, the vehicle can further comprise: a controller coupled to at least the first processor and the second processor. The controller can be configured to: receive the one or more automated driving commands from the second processor and a verification command from the first processor; in accordance with a determination that the one or more automated driving commands are verified according to the verification command, perform the one or more automated driving commands; and in accordance with a determination that the one or more automated driving commands are not verified according to the verification command, forego performing the one or more automated driving commands. Additionally or alternatively to one or more of the examples disclosed above, in some examples, a portion of the second data received at the second processor from the second plurality of sensors can be received via a first type of communication channel and transferred to the first processor via a second type of communication channel. The first type of communication channel can be different than the second type of communication channel. Additionally or alternatively to one or more of the examples disclosed above, in some examples, the vehicle can further comprise: a third processor coupled to the second processor. The third processor can be configured to: receive third data from a third plurality of sensors; processes the third data from the third plurality of sensors; and transmit the processed third data to at least the second processor. Additionally or alternatively to one or more of the examples disclosed above, in some examples, the second processor and the third processor can be in communication via a high-speed memory bus. Additionally or alternatively to one or more of the examples disclosed above, in some examples, the first processor and second processor can be mounted on a first printed circuit board and the third processor can be mounted on a second printed circuit board. Additionally or alternatively to one or more of the examples disclosed above, in some examples, processing the third data can include generating object data from the third plurality of sensors. The third processor can be further configured to transmit the object data generated from the third plurality of sensors to the first processor.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system comprising:
  a first processor configured to:
    receive first data from a first plurality of sensors; and
    generate one or more automated driving commands;
  a second processor coupled to the first processor and configured to:
    receive the one or more automated driving commands from the first processor;
    receive second data from a second plurality of sensors; and
    verify the one or more automated driving commands received from the first processor based on the second data;
  a first power supply coupled to the first processor; and
  a second power supply coupled to the second processor;
  wherein the first processor is configured to generate a first reset signal to reset the second power supply when a first reset condition is detected at the first processor, and the second processor is configured to generate a second reset signal to reset the first power supply when a second reset condition is detected at the second processor.

2. The system of claim 1, further comprising: a controller coupled to the first processor and the second processor, the controller configured to:
  in accordance with a determination that the one or more automated driving commands are verified, perform the one or more automated driving commands; and
  in accordance with a determination that the one or more automated driving commands are not verified, forego performing the one or more automated driving commands.

3. The system of claim 1, wherein a portion of the second data received at the second processor from the second plurality of sensors is received via a first type of communication channel and transferred to the first processor via a second type of communication channel, wherein the first type of communication channel is different than the second type of communication channel.

4. The system of claim 1, wherein verifying the automated driving commands comprises:
  determining, from the second data, whether one or more of the automated driving commands conflicts with one or more objects detected based on the second data;
  in accordance with the determination that the one or more of the automated driving commands conflicts with the one or more objects in the second data, generating a negative verification command; and
  in accordance with the determination that the one or more of the automated driving commands does not conflict with the one or more objects in the second data, generating a positive verification command.

5. The system of claim 4, wherein the second data includes at least one of radar data from one or more radar sensors or LIDAR data from one or more LIDAR sensors, and the one or more objects are detected from at least one of the radar data or the LIDAR data.

6. The system of claim 1, further comprising:
  a third processor coupled to the second processor and configured to:
    receive third data from a third plurality of sensors;
    processes the third data from the third plurality of sensors; and
    transmit the processed third data to at least the second processor.

7. The system of claim 6, wherein the second processor and the third processor are in communication via a high-speed memory bus.

8. The system of claim 6, wherein the first processor and second processor are mounted on a first printed circuit board and the third processor is mounted on a second printed circuit board.

9. The system of claim 6, wherein processing the third data includes generating object data from the third plurality of sensors, and wherein the third processor is further configured to transmit the object data generated from the third plurality of sensors to the first processor.

10. The system of claim 1, wherein the automated driving commands include at least one of a torque request and a steering request.

11. The system of claim 1, further comprising: a plurality of switches coupled to receive camera data from a plurality of cameras and configured to:
  transmit the camera data to the first processor; and
  transmit the camera data to an infotainment system.

12. The system of claim 1, further comprising: an application specific integrated circuit coupled to receive camera data from a plurality of cameras and configured to:
  transmit the camera data to the first processor; and
  transmit the camera data to an infotainment system.

13. A vehicle comprising:
  one or more sensors;
  a plurality of processors coupled to the one or more sensors, the plurality of processors including at least a first processor and a second processor, the first processor configured to generate one or more automated driving commands based on first data received from a first plurality of the sensors, and the second processor coupled to the first processor and configured to verify the one or more automated driving commands received from the first processor based on second data received from a second plurality of the sensors;

a first power supply coupled to the first processor; and a second power supply coupled to the second processor;

wherein the first processor is configured to generate a first reset signal to reset the second power supply when a first reset condition is detected at the first processor, and the second processor is configured to generate a second reset signal to reset the first power supply when a second reset condition is detected at the second processor.

14. The vehicle of claim 13, further comprising:

a controller coupled to at least the first processor and the second processor, the controller configured to:

receive the one or more automated driving commands from the second processor and a verification command from the first processor;

in accordance with a determination that the one or more automated driving commands are verified according to the verification command, perform the one or more automated driving commands; and in accordance with a determination that the one or more automated driving commands are not verified according to the verification command, forego performing the one or more automated driving commands.

15. The vehicle of claim 13, wherein a portion of the second data received at the second processor from the second plurality of sensors is received via a first type of communication channel and transferred to the first processor via a second type of communication channel, wherein the first type of communication channel is different than the second type of communication channel.

16. The vehicle of claim 13, further comprising: a third processor coupled to the second processor and configured to:

receive third data from a third plurality of sensors;

processes the third data from the third plurality of sensors; and transmit the processed third data to at least the second processor.

17. The vehicle of claim 16, wherein the second processor and the third processor are in communication via a high-speed memory bus.

18. The vehicle of claim 16, wherein the first processor and second processor are mounted on a first printed circuit board and the third processor is mounted on a second printed circuit board.

19. The vehicle of claim 16, wherein processing the third data includes generating object data from the third plurality of sensors, and wherein the third processor is further configured to transmit the object data generated from the third plurality of sensors to the first processor.

* * * * *